(12) United States Patent
Oh et al.

(10) Patent No.: US 7,774,773 B2
(45) Date of Patent: Aug. 10, 2010

(54) ACTIVE NODE, AND CONTENTS TRANSFER SYSTEM AND METHOD USING THE ACTIVE NODE

(75) Inventors: Seung Hee Oh, Daejeon (KR); Taek Yong Nam, Daejeon (KR); Ki Jo Kim, Seoul (KR); Kyungshik Lim, Daegu (KR); Jun Ho Lee, Daegu (KR); Sung Won Sohn, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 657 days.

(21) Appl. No.: 11/023,911

(22) Filed: Dec. 27, 2004

(65) Prior Publication Data
US 2006/0047854 A1    Mar. 2, 2006

(30) Foreign Application Priority Data
Aug. 4, 2004    (KR) .................... 10-2004-0061419

(51) Int. Cl.
G06F 9/44    (2006.01)
G06F 15/16    (2006.01)

(52) U.S. Cl. .................. 717/172; 717/168; 709/203; 709/218

(58) Field of Classification Search ......... 717/168–178; 709/201–203, 217–219
See application file for complete search history.

(56) References Cited

U.S. PATENT DOCUMENTS

| | | | | |
|---|---|---|---|---|
| 5,727,159 | A * | 3/1998 | Kikinis ........................ | 709/246 |
| 6,167,441 | A * | 12/2000 | Himmel ...................... | 709/217 |
| 6,185,625 | B1 * | 2/2001 | Tso et al. .................... | 709/247 |
| 6,421,733 | B1 * | 7/2002 | Tso et al. .................... | 709/246 |
| 6,430,624 | B1 * | 8/2002 | Jamtgaard et al. ........... | 709/246 |
| 6,493,758 | B1 * | 12/2002 | McLain ........................ | 709/227 |
| 6,678,518 | B2 * | 1/2004 | Eerola ........................ | 455/422.1 |
| 6,704,798 | B1 * | 3/2004 | Mogul ........................ | 709/246 |
| 6,880,014 | B2 * | 4/2005 | Brown et al. ................. | 709/227 |
| 6,888,477 | B2 * | 5/2005 | Lai et al. ....................... | 341/50 |

(Continued)

FOREIGN PATENT DOCUMENTS

JP    2002-007238    1/2002

(Continued)

OTHER PUBLICATIONS

Ozen et al., "Highly Personalized Information Delivery to Mobile Clients," 2001, ACM, p. 46-53.*

(Continued)

*Primary Examiner*—Wei Y Zhen
*Assistant Examiner*—Qing Chen
(74) *Attorney, Agent, or Firm*—Blakey, Sokoloff, Taylor & Zafman

(57) ABSTRACT

Provided are an active node, and a system and method of transmitting contents using the active node. When contents to be transmitted from a contents server to a terminal are received, resource information of the terminal is identified, the contents transmitted from the contents server are transformed into a pertinent format to the terminal based on the resource information, information included in a header of the contents is transformed into information about the transformed contents and is transmitted to the terminal, thereby reducing load according to contents transformation of a contents server.

6 Claims, 4 Drawing Sheets

U.S. PATENT DOCUMENTS

| | | | | |
|---|---|---|---|---|
| 6,925,481 | B2* | 8/2005 | Singhal et al. | 709/200 |
| 6,944,665 | B2* | 9/2005 | Brown et al. | 709/227 |
| 6,947,973 | B2* | 9/2005 | Shimura et al. | 709/217 |
| 7,010,581 | B2* | 3/2006 | Brown et al. | 709/218 |
| 7,068,599 | B1* | 6/2006 | Jiang et al. | 370/230.1 |
| 7,114,007 | B2* | 9/2006 | Sasaki | 709/246 |
| 7,117,273 | B1* | 10/2006 | O'Toole et al. | 709/252 |
| 7,120,702 | B2* | 10/2006 | Huang et al. | 709/246 |
| 7,185,077 | B1* | 2/2007 | O'Toole et al. | 709/223 |
| 7,254,621 | B2* | 8/2007 | Singhal et al. | 709/218 |
| 7,263,548 | B2* | 8/2007 | Daswani et al. | 709/217 |
| 7,305,453 | B2* | 12/2007 | Awamoto et al. | 709/217 |
| 7,574,486 | B1* | 8/2009 | Cheng et al. | 709/219 |
| 7,590,759 | B2* | 9/2009 | Omar et al. | 709/246 |
| 7,636,792 | B1* | 12/2009 | Ho | 709/246 |
| 2002/0107985 | A1* | 8/2002 | Hwang et al. | 709/246 |
| 2002/0150228 | A1 | 10/2002 | Umeda et al. | |
| 2002/0155848 | A1* | 10/2002 | Suryanarayana | 455/466 |
| 2002/0156896 | A1* | 10/2002 | Lin et al. | 709/227 |
| 2003/0033432 | A1* | 2/2003 | Simpson et al. | 709/246 |
| 2003/0110234 | A1* | 6/2003 | Egli et al. | 709/217 |
| 2004/0103143 | A1* | 5/2004 | Chikada et al. | 709/203 |
| 2004/0205620 | A1* | 10/2004 | Nishikiori et al. | 715/523 |

FOREIGN PATENT DOCUMENTS

| | | |
|---|---|---|
| KR | 2003-0025384 | 3/2003 |
| KR | 1020030058429 | 7/2003 |
| KR | 1020030088929 | 11/2003 |

OTHER PUBLICATIONS

Rao et al., "iMobile: A Proxy-Based Platform for Mobile Services," 2001, ACM, p. 3-10.*

Chen et al., "iMobile EE—An Enterprise Mobile Service Platform," 2003, Kluwer Academic Publishers, p. 283-297.*

Berners-Lee et al., "Hypertext Transfer Protocol—HTTP/1.0," May 1996, IEFT, p. 1-60.*

"Wireless Application Protocol—White Paper," Jun. 2000, Wireless Internet Today, p. 1-19.*

* cited by examiner

ACTIVE NODE, AND CONTENTS TRANSFER SYSTEM AND METHOD USING THE ACTIVE NODE

This application claims the benefit of Korean Patent Application No. 10-2004-61419, filed on Aug. 4, 2004, in the Korean Intellectual Property Office, the disclosure of which is incorporated herein in its entirety by reference.

BACKGROUND OF THE INVENTION

1. Field of the Invention

The present invention relates to a system and method for providing contents pertinent to a terminal, and more particularly, to an apparatus and method for providing pertinent contents to a terminal and reducing load on a contents server by using active network technology.

2. Description of the Related Art

Conventional mobile multimedia contents transmission is performed after contents are transformed to fit the specific of a mobile terminal in a contents server. Accordingly, when a great number of users require contents transmission at the same time, a contents server is overloaded. In this case, contents cannot be transmitted to all mobile terminals. Also, when contents service of a new form is provided or a new mobile terminal is launched, some functions of all contents servers have to be changed to reflect the contents service of the new form or the new mobile terminal.

SUMMARY OF THE INVENTION

The present invention provides an active node, and a contents transmission system and method which reduce contents conversion load on a contents server, solve upgrade problems generated when a new contents service is provided or a new terminal is launched, and provide pertinent contents to a terminal.

According to an aspect of the present invention, there is provided an active node located between a terminal and a contents server, the active node including: a resource information manager that receives hardware/software resources information of the terminal using a predetermined framework; a contents transformer that transforms contents output from the contents server by request of the terminal into a pertinent format to the terminal based on the resources information of the terminal; and a contents header manager that transforms information included in a header of the contents into information about the transformed contents.

According to another aspect of the present invention, there is provided a method of providing contents, including the operations of: receiving contents transmitted from a contents server to a predetermined terminal; receiving hardware/software resources of the terminal using a predetermined framework; transforming the contents transmitted from the contents server into a pertinent format to the terminal based on the resource information of the terminal; and transforming information included in a header of the contents into information of the transformed contents.

According to still another aspect of the present invention, there is provided a contents transmission system including: a terminal which requests transmitting a predetermined contents; a contents server which transmits contents corresponding to the contents transmission request when the contents transmission request is received from the terminal via a wireless data network; and an active node which is located between the contents server and the terminal, transforms the contents transmitted from the contents server into contents pertinent to the terminal based on hardware/software resources information of the terminal, and transmits the contents to the terminal.

Hereby, a load according to change of a contents server may be decreased.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
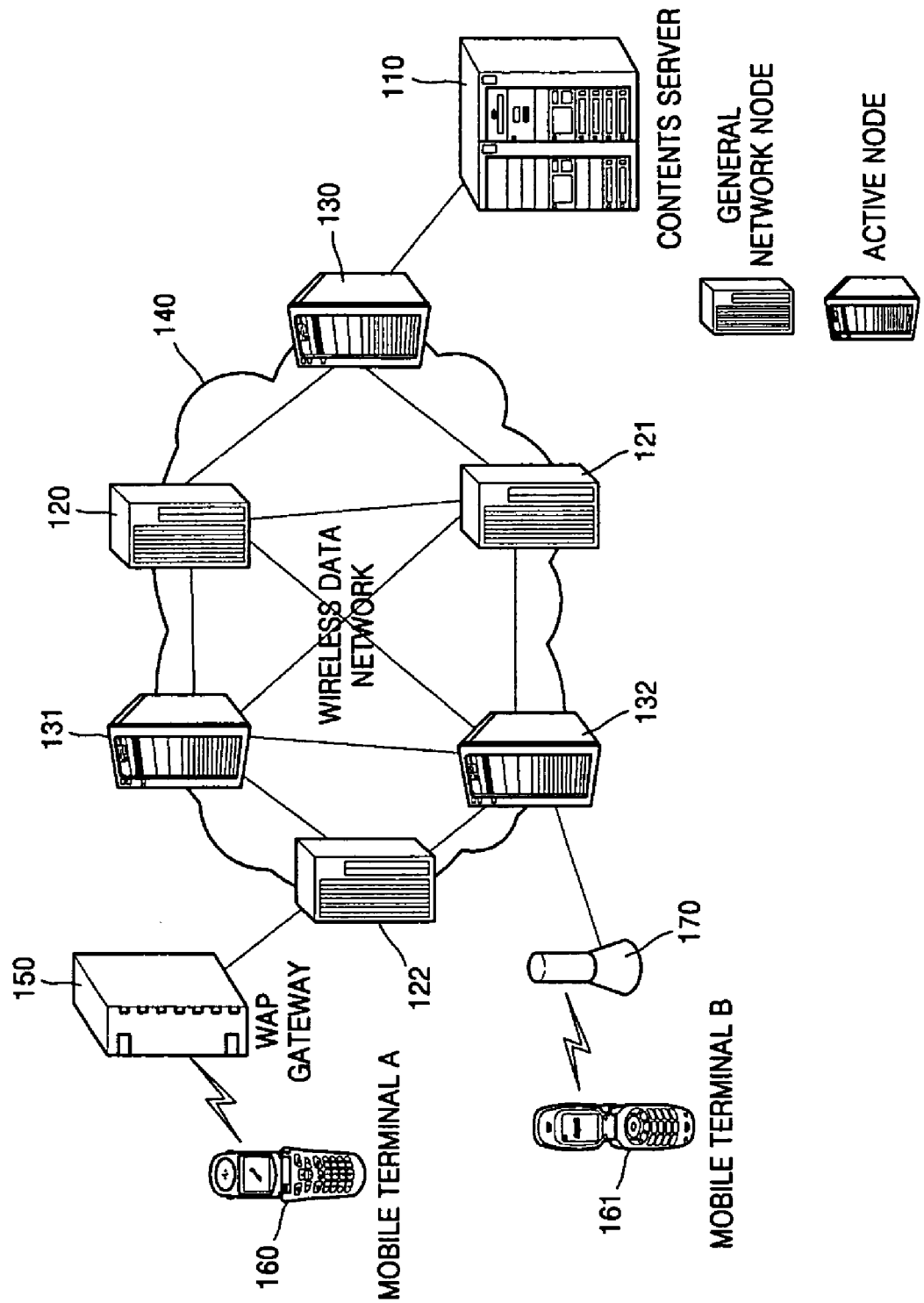
FIG. 1 is a diagram of a configuration of a contents transmission network according to an embodiment of the present invention.

FIG. 1 is a diagram of a configuration of a contents transmission network according to an embodiment of the present invention.

Referring to FIG. 1, a contents transmission network consists of a contents server 110, general network nodes 120, 121, and 122, active nodes 130, 131, and 132, and terminals 160 and 161. The contents server 110 includes a variety of multimedia contents for terminals and transmits contents corresponding to a contents request of the terminals 160 and 161. The general network nodes 120, 121, and 122 transmit packets to their destination on a wireless data network 140.

The active nodes 130, 131, and 132 consist of a node operating system, an execution environment, and active applications and are intermediate nodes on an active network which performs storing-transmitting functions and also storing-processing-transmitting functions. When a packet is received, the active nodes 130, 131, and 132 determine whether the packet is executed. When the packet is executed, an active code is transmitted to the execution environment to execute it. The active nodes 130, 131, and 132 transmit contents received from the contents server or transform them and transmit the transformed contents to a next node according to an execution result.

In the contents transmission network according to an embodiment of the present invention, the contents server 110 is not required to directly transform contents, which is different from the conventional art. Contents transformation is performed in the active nodes 130, 131, and 132 located between the contents server 110 and the terminals 160 and 161. Accordingly, contents transformation load on the contents server 110 is reduced.

The contents transformed by the active node are transmitted to the terminals 160 and 161 via a wireless application protocol (WAP) gateway 150 or a base station 170 according to the specific of the terminals 160 and 161.

Figure 2:
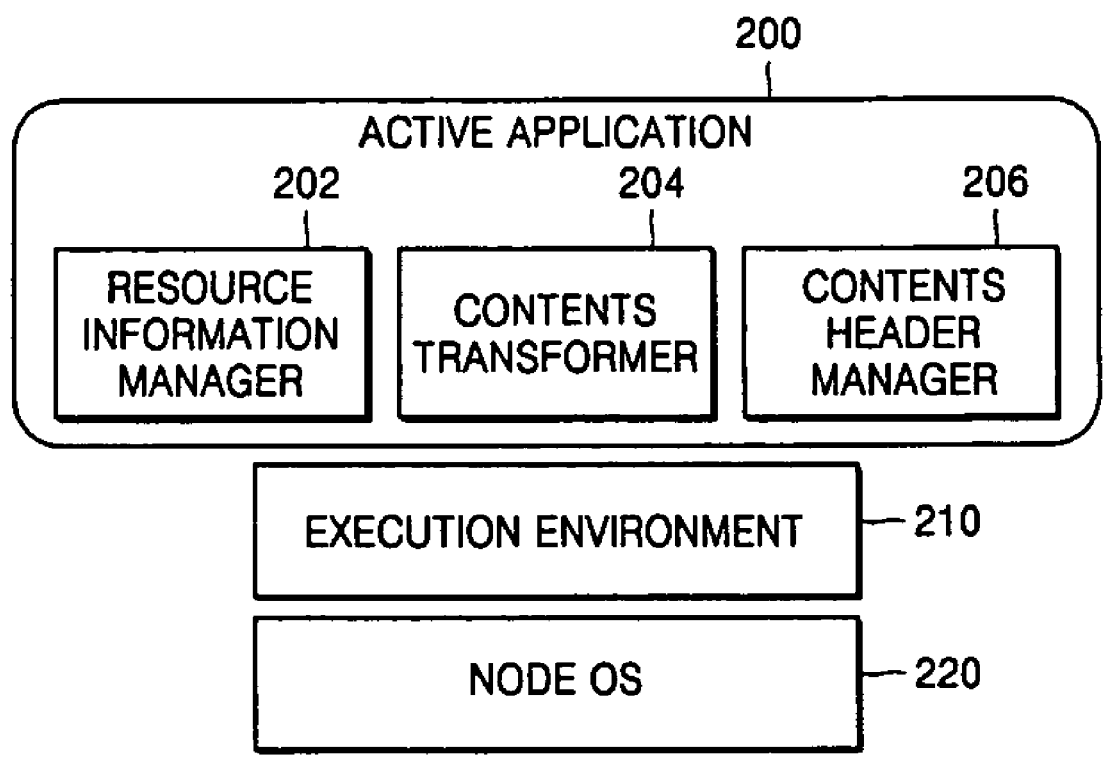
FIG. 2 is a diagram of a configuration of an active node according to an embodiment of the present invention.

FIG. 2 is a diagram of a configuration of an active node according to an embodiment of the present invention.

Referring to FIG. 2, the active node includes active applications 202, 204, and 206, an execution environment 210, and a node operating system 220. The active application 200 includes a resource information manager 202, a contents transformer 204, and a contents header manager 206.

The node operating system 220 performs packet scheduling, resource management, and packet classifying, and the execution environment 210 provides an environment in which an active packet is executed.

The resource information manager 202 receives information of hardware/software resources of a terminal that obtains contents via a predetermined framework. The resource information manager 202 can use composite capability/preference profile (CC/PP) as a framework to receive resource information of a terminal. The CC/PP is a standard established by the World Wide Web Consortium based on XML and a framework for defining information which is exchanged between a client and a server in order to provide contents pertinent to a device. The resource information manager 202 may define another communication protocol for use.

The contents transformer 204 transforms contents transmitted from a contents server to a terminal into a format pertinent to an environment of the terminal. For this, when contents are received, the resource information manager 202 receives hardware/software resources information of the terminal which required contents via the CC/PP framework. The contents transformer 204 transforms contents into a format pertinent to a hardware/software environment of the terminal based on terminal resource information received by the resource information manager 202.

The contents transformer 204 includes functions for transforming contents appropriate to varied hardware/software resources of the terminal, such as size of contents, image/data format, and colors. Also, the contents transformer 204 may updates contents transformation information via an active packet of the active network. Accordingly when terminals having new hardware/software resources are launched or contents providing new services are made, the active node can receive new contents transformation information via the active network and automatically update them.

When the contents are transformed by the contents transformer 204, the contents header manager 206 reflects information about the transformed contents to a contents header. In the contents header, information about contents, such as a file type, an image size, an image type, are recorded. Accordingly, if a file type or an image size of contents is transformed by the contents transformer 204, contents header information is changed based on the transformed contents information.

Referring to FIG. 1, one or more active nodes are on a wireless data network, and contents output from a contents server are transmitted to a terminal requiring the contents via one or more an active node. Accordingly, if any one of the active nodes cannot perform contents transformation pertinent to the terminal, the contents are transmitted to another active node which can perform the contents transformation. Then, the active node according to an embodiment of the present invention reduces contents transformation load on a contents server and distributes contents transformation functions on each of the active nodes, thereby dispersing load according to contents transformation of the active node.

Figure 3:
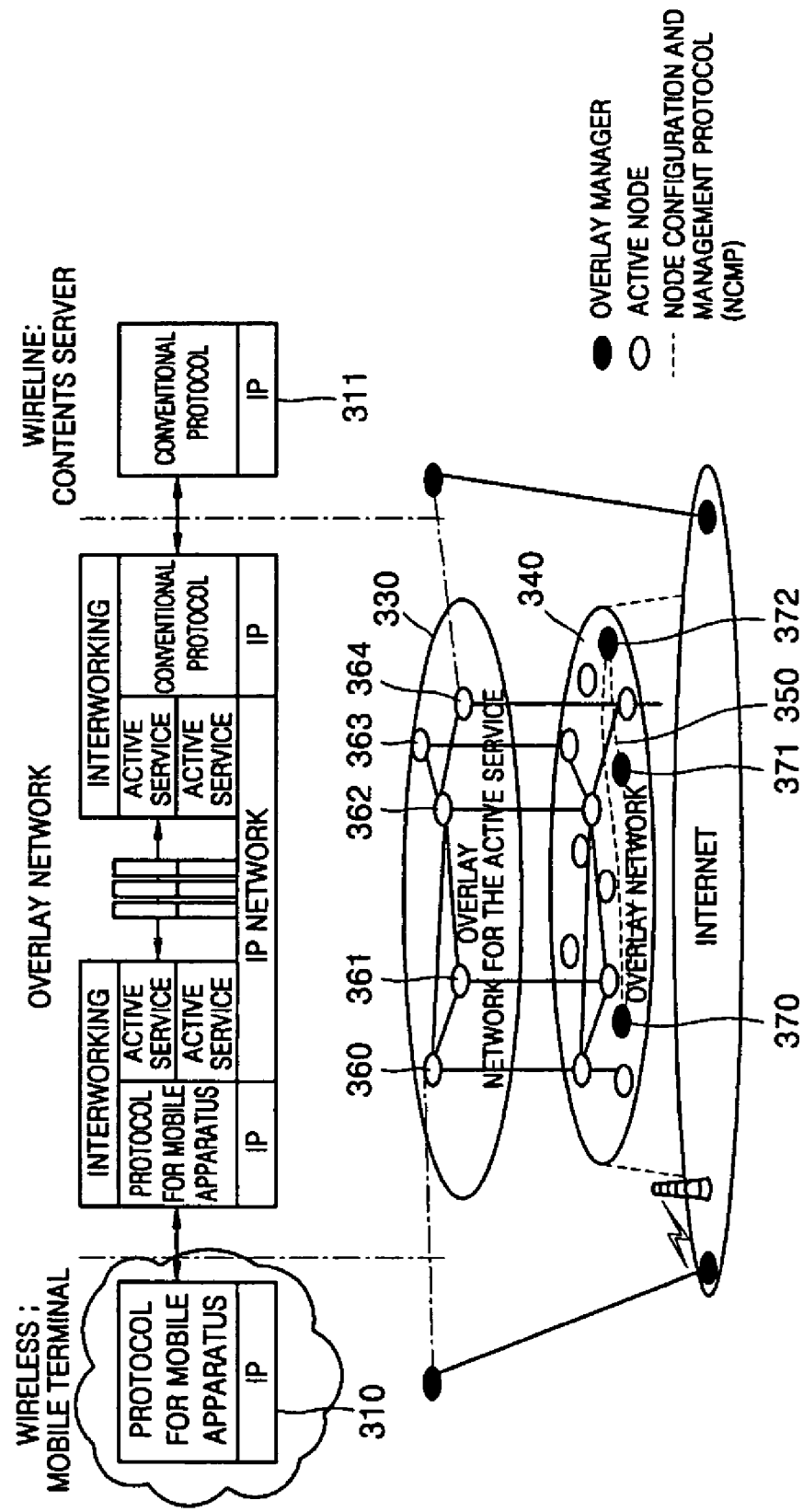
FIG. 3 is a diagram of an overlay network configuration to connect an active network according to an embodiment of the present invention and a conventional network.

FIG. 3 is a diagram of an overlay network configuration to connect an active network according to an embodiment of the present invention and a conventional network.

Referring to FIG. 3, there are general wireless network nodes 310 and 311 based on conventional wireless protocol and IP and the active nodes 360 through 364 in an overlay network 340. The node 310 based on IP and protocol specific to a mobile apparatus is generally a mobile terminal, and use the protocol for mobile communication, such as WAP, and the node 311 combined with traditional protocol and IP is generally a contents server and use the conventional Internet protocol, such as HTTP.

The overlay network 340 for a mobile multimedia contents service performed on the Internet is formed, and, logically, another overlay network 330 is formed on the overlay network 340. The overlay network 340 is formed of overlay managers 370, 371, and 372 to manage the active nodes 360 through 364 and general wireless network nodes. Between the nodes described above, node configuration and management protocol NCMP 350 is used for configuration and management between nodes.

The overlay managers 370, 371, and 372 generate interactive unicast tunnels to each other, thereby forming mesh topology. The overlay managers 370, 371, and 372 synchronize active node information existing on the overlay network 340 using the NCMP, process a query generated between nodes, set each node of the overlay network 340, and process an exception condition generated during performing.

Figure 4:
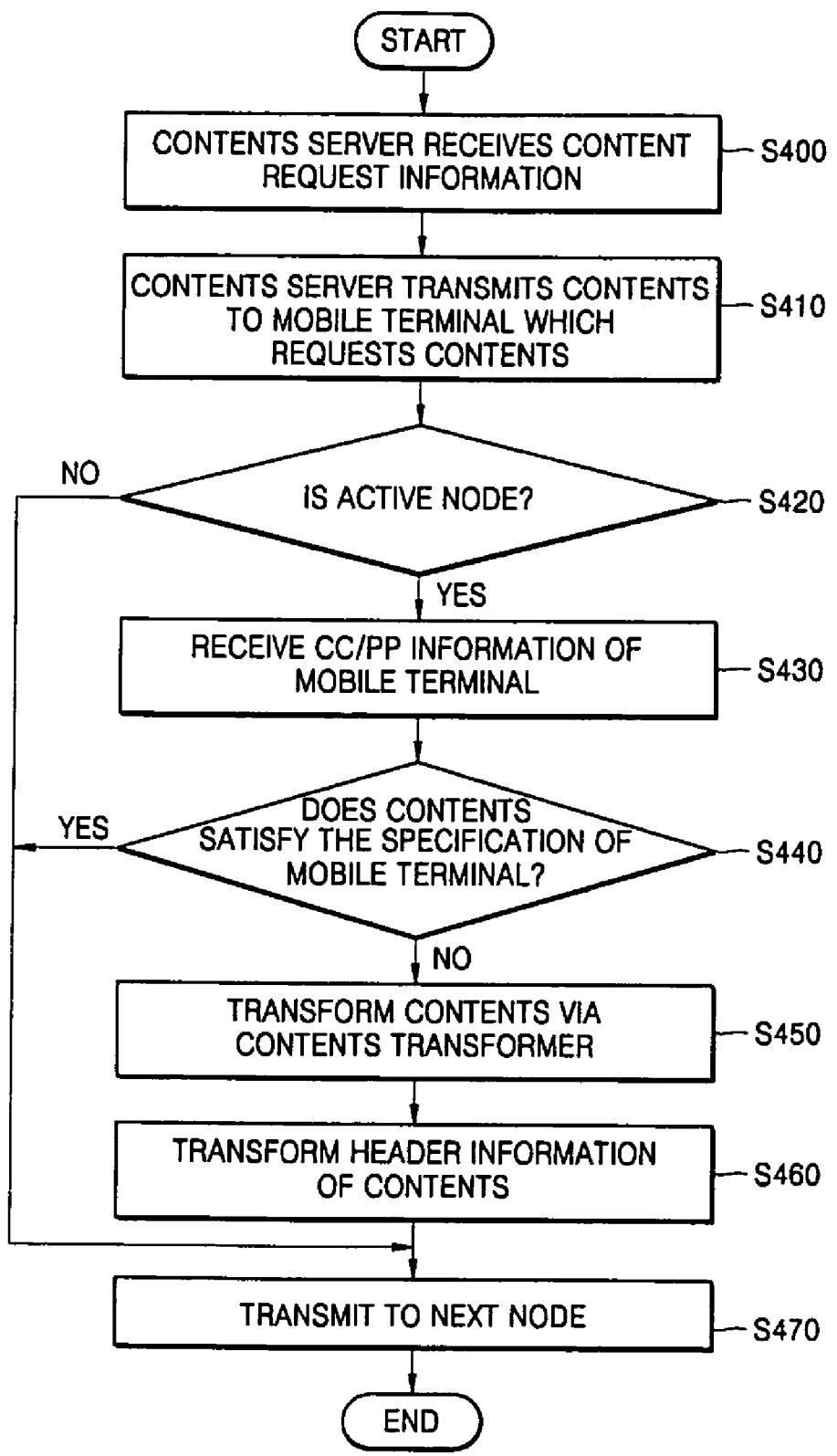
FIG. 4 is a flow chart illustrating a contents providing method according to an embodiment of the present invention.

FIG. 4 is a flow chart illustrating a contents providing method according to an embodiment of the present invention.

Referring to FIGS. 1, 2, and 4, when the mobile terminals request the contents server 110 to transmit predetermined contents (S400), the contents server 110 transmits the contents to the mobile terminals 160 and 161 (S410). Contents transmitted via the wireless data network 140 pass through one or more active nodes 130, 131, and 132 and general network nodes 120, 121, and 122.

When the contents pass through the active nodes 130, 131, and 132 (S420), the active nodes 130, 131, and 132 perform contents transformation according to an embodiment of the present invention. First, the resource information manager 202 of the active node receives specific, hardware/software resources, of the mobile terminals 160 and 161 through the CC/PP framework (S430).

The contents transformer 204 transforms the contents to be pertinent to the specific of the mobile terminals 160 and 161 (S440). The contents transformer 204 includes one or more transformation functions to transform contents size, image/data formats, and colors. If the contents transformer 204 does not have every function to transform contents into be pertinent to a terminal, the contents transformer 204 transforms the contents as much as possible and transmits the contents to a next active node to transform the rest of the contents.

When the contents transformation is performed by the contents transformer 204 (S450), the contents header manager 206 reflects information of the contents transformation on the contents header information (S460). Next, the contents are transmitted to a next node (S470).

The processes described above are repeated until the contents reach the base station 170 to which the mobile terminals 160 and 161 belong or the WAP gateway 150.

According to the present invention, load according to contents transformation is not concentrated on a contents server and is dispersed to each of the active nodes. Also, the contents transformation method according to the present invention can be easily performed on active nodes via active network technology.

Also, when new terminals or new contents services are launched, contents transformation functions of each of the active nodes are easily and automatically updated via active network technology without a function transformation of a contents server.

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. An active node located between a terminal and a contents server, the active node comprising a computer-readable storage medium storing applications executable by the active node, the applications comprising:

a resource information manager that receives hardware/software resources information of the terminal using a predetermined framework;

a contents transformer that transforms contents output from the contents server into a pertinent format and transmits transformed contents to the terminal based on the hardware/software resources information of the terminal, and that receives contents transformation information via an active packet of an active network and updates functions for contents transformation based on the contents transformation information; and a contents header manager to place information about the transformed contents in a header of the transformed contents, wherein the active node transmits partially transformed contents to a different active node over an overlay network in response to a determination that the active node does not have a function to complete transformation of the contents, wherein the overlay network is coupled to the contents server via a wireline network and coupled to the terminal via a wireless data network, the overlay network comprising a plurality of overlay managers to manage a plurality of active nodes, the plurality of overlay managers to generate interactive tunnels to each other and to form a mesh topology, to synchronize active node information using a node configuration and management protocol (NCMP), to process a query generated between the plurality of active nodes, to set each node of the overlay network, and to process an exception condition generated during operation, wherein the resource information manager receives the hardware/software resources information of the terminal using a composite capability/preference profile framework.

2. The active node of claim 1, wherein the contents transformer downloads and stores contents transformation information pertinent to hardware/software resources information of various terminals using an active packet of an active network.

3. A method of an active node for providing contents, comprising the operations of:

receiving contents transmitted from a contents server to a predetermined terminal;

receiving hardware/software resources information of the predetermined terminal using a predetermined framework;

transforming the contents transmitted from the contents server into a pertinent format to the predetermined terminal based on the hardware/software resources information of the predetermined terminal;

placing information about the transformed contents in a header of the transformed contents; and transmitting partially transformed contents to a different active node over an overlay network in response to a determination that the active node does not have a function to complete transformation of the contents, wherein the overlay network is coupled to the contents server via a wireline network and coupled to the predetermined terminal via a wireless data network, the overlay network comprising a plurality of overlay managers to manage a plurality of active nodes, the plurality of overlay managers to generate interactive tunnels to each other and to form a mesh topology, to synchronize active node information using a node configuration and management protocol (NCMP), to process a query generated between the plurality of active nodes, to set each node of the overlay network, and to process an exception condition generated during operation, and functions for contents transformation is updated based on contents transformation information received via an active packet of an active network, wherein the operation of receiving hardware/software resources information of the predetermined terminal further comprises the operation of receiving hardware/software resources information of the predetermined terminal using a composite capability/preference profile framework.

4. The method of claim 3, wherein the operation of transforming the contents further comprises the operation of downloading contents transformation information pertinent to various hardware/software resources information using an active packet of an active network.

5. A contents transmission system comprising:

a terminal which sends requests, via a wireless data network, for transmitting a predetermined contents;

a contents server which receives the requests and transmits, via a wireline network, contents corresponding to the predetermined contents in response to the requests; and an overlay network coupled to the wireless data network and the wireline network, the overlay network comprising a plurality of overlay managers to manage a plurality of active nodes, the plurality of overlay managers to generate interactive tunnels to each other and to form a mesh topology, to synchronize active node information using a node configuration and management protocol (NCMP), to process a query generated between the plurality of active nodes, to set each node of the overlay network, and to process an exception condition generated during operation, wherein an active node of the plurality of active nodes transforms the contents transmitted from the contents server into contents pertinent to the terminal based on hardware/software resources information of the terminal, places information about the transformed contents in a header of the transformed contents, and transmits partially transformed contents to another one of the plurality of active nodes over the overlay network in response to a determination that the active node does not have a function to complete transformation of the contents, and update functions for contents transformation based on contents transformation information received via an active packet of an active network, a resource information manager which receives hardware/software resources information of the terminal using a composite capability reference profile framework.

6. The contents transmission system of claim 5, further comprising:

a contents transformer which transforms the contents transmitted from the contents server into a format pertinent to the terminal based on the hardware/software resources information of the terminal; and a contents header manager to place the information about the transformed contents in the header of the transformed contents.

* * * * *